(12) United States Patent
Drapeko et al.

(10) Patent No.: US 11,586,432 B1
(45) Date of Patent: Feb. 21, 2023

(54) MODULAR SOFTWARE ARCHITECTURE FOR MACHINE LEARNING PIPELINES

(71) Applicant: MCKINSEY & COMPANY, INC., New York, NY (US)

(72) Inventors: Roman Drapeko, London (GB); Sheldon Tein Tshun Tsen, London (GB); Wesley Weishu Leong, London (GB); Sam Bourton, London (GB); Jonathan Jenkins, London (GB)

(73) Assignee: MCKINSEY & COMPANY, INC., New York, NY (US)

(*) Notice: Subject to any disclaimer, the term of this patent is extended or adjusted under 35 U.S.C. 154(b) by 0 days.

(21) Appl. No.: 17/877,357

(22) Filed: Jul. 29, 2022

Related U.S. Application Data

(60) Provisional application No. 63/227,762, filed on Jul. 30, 2021.

(51) Int. Cl.
*G06F 8/70* (2018.01)
*G06F 8/30* (2018.01)

(52) U.S. Cl.
CPC . *G06F 8/70* (2013.01); *G06F 8/31* (2013.01)

(58) Field of Classification Search
None
See application file for complete search history.

(56) References Cited

U.S. PATENT DOCUMENTS

| | | | |
|---|---|---|---|
| 8,812,752 B1* | 8/2014 | Shih | G06F 9/542 717/109 |
| 10,838,833 B1* | 11/2020 | Jibaja | G06F 11/2094 |
| 2016/0179063 A1* | 6/2016 | De Baynast De Septfontaines | H04L 43/08 700/11 |
| 2018/0276343 A1* | 9/2018 | Curbera | G16H 70/20 |

OTHER PUBLICATIONS

Gorton et al., "Towards Composing Data Aware Systems Biology Workflows on Cloud Platforms A MeDICi-based Approach," IEEE, 8pg, 2011. (Year: 2011).*

Lampa et al., "SciPipe: A workflow library for agile development of complex and dynamic bioinformatics pipelines," Oxford, 13pg, 2019. (Year: 2019).*

* cited by examiner

*Primary Examiner* — Ryan D. Coyer

(74) *Attorney, Agent, or Firm* — Marshall, Gerstein & Borun LLP; Randall G. Rueth

(57) ABSTRACT

As organizations scale analytics, a challenge is the huge increase in number of analytics pipelines to be maintained by developers. In here, lies an example method and modular software architecture to assemble analytics pipeline from reusable components. (1) Reusable components can be utilities where each utility is versioned and has a collection of programming functions, also known as nodes, that follow "data-in-data-out" convention. As nodes are building blocks of a pipeline, an assembly instruction and human readable configurations can now be created to define a project pipeline from a repository of pipelines and well-versioned utili- (Continued)

ties. (2) By separating out re-usable functionalities from pipelines and data layers, this layered architecture can now support upgrades of functionalities overtime without re-writing of pipelines. (3) As reusable components become functionally exhaustive, these assembly instructions and configurations can then be decoupled from pipelines as knowledge which developers can conduct meta-analysis of configurations used across projects.

20 Claims, 10 Drawing Sheets

MODULAR SOFTWARE ARCHITECTURE FOR MACHINE LEARNING PIPELINES

CROSS-REFERENCE TO RELATED APPLICATIONS

This application claims the benefit of U.S. Provisional Application No. 63/227,762, filed Jul. 30, 2021, and entitled MODULAR SOFTWARE ARCHITECTURE, which is incorporated herein by reference in its entirety.

FIELD OF THE DISCLOSURE

The present disclosure generally relates to data processing and analytics pipelines and, more particularly, to a modular software architecture for creating data processing and analytics pipelines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Currently, when creating a data processing and analytics pipeline, engineers and developers must code the entire pipeline from scratch even if similar projects have been completed before, i.e., at the same organization. Although it is sometimes possible to re-use sections of code from different projects, this can become difficult when the previous project is a single monolithic pipeline that cannot be abstracted or re-used, or when current project must be written in another programming language compared to previous project, or when some aspects of the project would need to be borrowed from multiple previous projects written in multiple different programming languages.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

Systems, methods, and underlying architecture to assemble and instantiate a data processing and analytics pipeline from reusable code is provided herein. The assembly and instantiation of pipelines may be expressed as a declarative configuration language, decoupled from code, that is both readable by a human being and able to be processed by a processor and/or a machine. Generally speaking, a pipeline may be assembled from reusable code and executed by a processor (for example, a compute machine). To enable such assembly, reusable code may be stored as "nodes," which are the building blocks of pipelines and which are available as domain-specific and capability-specific programming libraries. Each library is versioned, documented, tested and provides a data API, a collection of programming functions that follow a "data-in-data-out" convention. For nodes, the architecture sets to ensure in-out arguments are known and defined. As a pipeline is simply a set of nodes, one pipeline can be constructed from other pipelines. Generally speaking, components of a pipeline need to be versioned, backwards compatible, follow a set of conventions and provide a clear "public" API. By having reusable code that is available, mature, versioned and functionally exhaustive, pipeline creation can mainly involve fine-tuning reusable code rather than rather than writing entirely new code—i.e., defining how to assemble various "nodes" or building blocks together rather than inventing new types of nodes or building blocks. As reusable code is available commodity, these nodes can be decoupled from specific pipelines in respective repositories. This knowledge expressed by each node can later be analyzed, combined and automatically processed by the machine in order to reproduce the initial (or combined) state of the pipeline.

The modular pipeline architecture described herein is compatible with and may be integrated into pipeline orchestration/execution frameworks like Kedro, Airflow, Dataiku, or any other suitable pipeline orchestration/execution framework. Advantageously, the techniques provided herein allow for the development of simultaneous projects or analytics pipeline using same components and repositories. Additionally, the techniques provided herein allow for the ability to differentiate asset and project code, which improves the maintenance and support that can be provided for delivered projects, i.e., because components of a project can easily be updated/upgraded as needed. Finally, the techniques provided herein allow for the decoupling of project-related knowledge, components, etc., from the specific projects of which they are a part, allowing for improved re-usability of components of existing projects in a new project.

Figure 1:
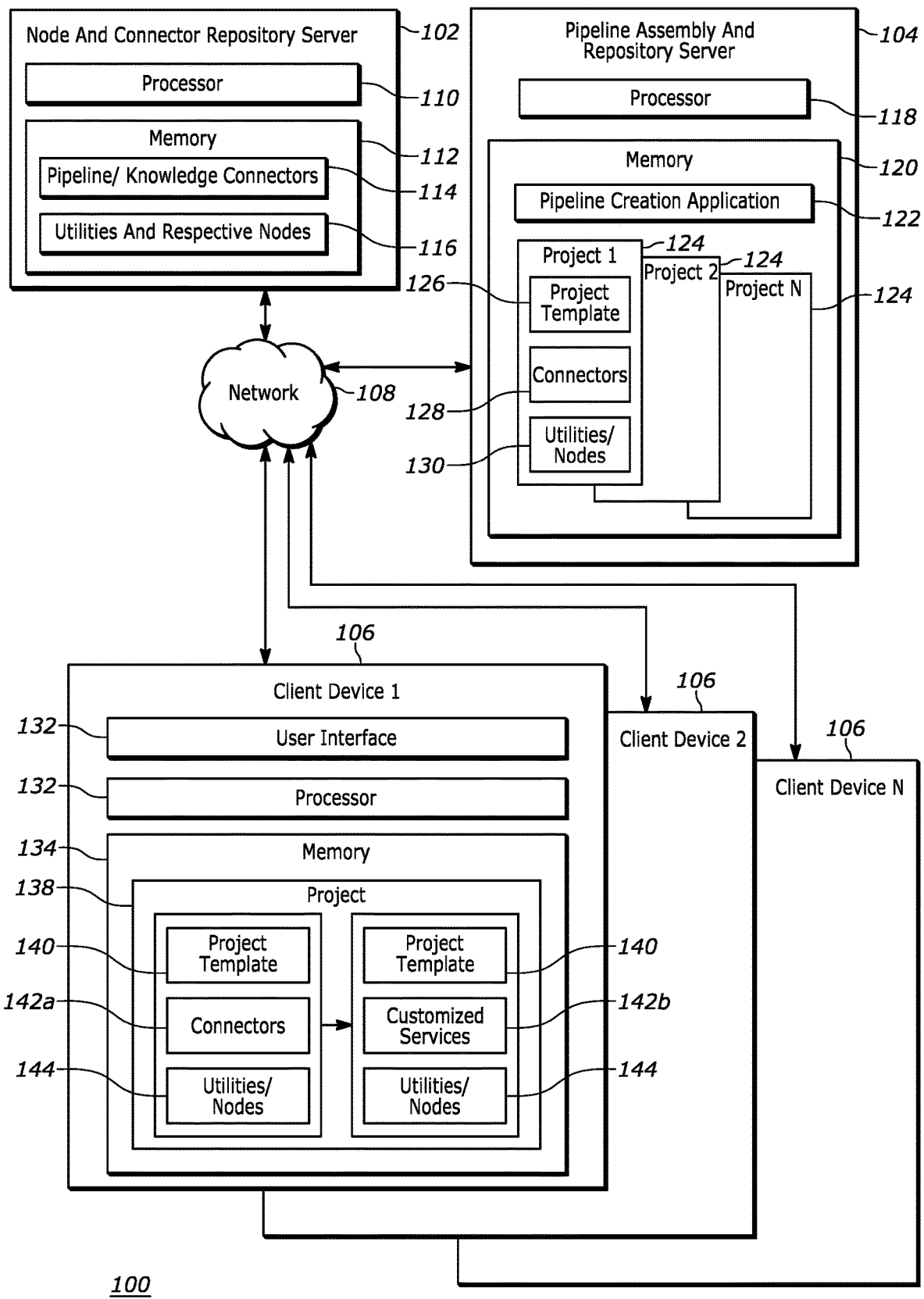
FIG. 1 illustrates a block diagram of an example a modular software architecture system for creating data processing and analytics pipelines, in accordance with some embodiments.

FIG. 1 illustrates a block diagram of an example modular software architecture system for machine learning pipelines, 100, in accordance with some embodiments. The high-level architecture illustrated in FIG. 1 may include both hardware and software applications, as well as various data communications channels for communicating data between the various hardware and software components, as is described below.

The system 100 may include a node and connector repository server 102, a pipeline assembly and repository server 104, and one or more client devices 106, which may each communicate with one another via a wired or wireless connection, such as the network 108.

The node and connector repository server 102 may include one or more processors 110 and a memory 112. The one or more processors 110 may interact with the memory 112 to obtain, for example, computer-readable instructions stored in the memory 112. The computer-readable instructions stored in the memory 112 may cause the one or more processors 110 to receive pipeline/knowledge connectors 114 as well as utilities and/or their respective nodes 116 created by users and/or the client devices 106, and store the pipeline/knowledge connectors 114 and utilities and/or their respective nodes 116 in the memory 112. Moreover, the computer-readable instructions stored in the memory 112 may cause the one or more processors 110 to obtain or access the pipeline/knowledge connectors 114 and/or utilities and/or their respective nodes 116 stored in the memory 112 and send obtained or accessed pipeline/knowledge connectors 114 and/or utilities and/or their respective nodes 116 to the pipeline assembly and repository server 104 and/or the client devices 106, e.g., in response to requests for particular pipeline/knowledge connectors 114 and/or utilities and/or their respective nodes 116 from the pipeline assembly and repository server 104 and/or the client devices 106.

Generally speaking, a node is a first-class citizen that can be defined as a call with known parameters to a function or operation that follows the following signature:

$$f=(x{:}X,\ldots)\rightarrow \text{DataSet where } X \text{ is DataSet or Parameter}$$

Input parameters of a function are of a dataset and/or parameter type and may be in any order. The output parameter may be a data set. Generally speaking, a data set is a class abstraction on top of any data format (csv, excel, parquet) that allows the node or the pipeline to save and load this data. A data set class is instantiated with parameters that are expected to be provided for connectivity, data processing, read modes, save modes, etc. Either 'save' or 'load' operation can be used within life of any single instantiation of a class. In some examples, the input and/or output parameters can be null/empty.

Node functions or operations are designed to accept various parameters and, depending on values passed, each function or operation will have a particular behavior. Parameters provide additional instructions to a node function to control its behavior. For example, a given parameter might provide instructions how exactly to filter data. These parameters make a node function reusable and applicable to different filtering contexts.

That is, the nodes of the node and connector repository server 102 may be configured to receive at least one input parameter and perform at least one operation on the at least one input parameter to generate at least one output parameter. That is, a given node may operate on one or more input parameters to generate or produce one or more output parameters. Within the set of nodes, various nodes may utilize different programming languages to operate on their respective input parameters. That is, a first node in the set of nodes may operate on several first input parameters using a first programming language to produce several first output parameters, and a second node in the set of nodes may operate on a second input parameter using a second programming language to produce a second output parameter, and a third node in the set of nodes may operate on a plurality of third input parameters using a third programming language to produce a third output parameter, etc.

Generally speaking, the connectors (described in greater detail at FIG. 4) may be configured to connect nodes to one another, i.e., by receiving one or more output parameters from one node and providing the one or more output parameters to other nodes as input parameters. In some examples, the connectors may be configured to perform their own operations on received parameter(s) before providing the parameter(s) to the next node. Furthermore, in some examples, the connectors may be configured to connect (i.e., receive output parameters from and provide input parameters to) various nodes operating in different programming languages. That is, a first node may operate on one or more first input parameters using a first programming language to generate one or more first output parameters. A connector may receive at least one of the one or more first output parameters and may provide the at least one first output parameter to a second node as an input parameter. The second node may in turn operate on the input parameter (i.e., the first output parameter from the first node) using a second programming language to generate one or more second output parameters.

The pipeline assembly and repository server 104 may include one or more processors 118, and a memory 120. The one or more processors 118 may interact with the memory 120 to obtain, for example, computer-readable instructions stored in the memory 120. The computer-readable instructions stored in the memory 120 may cause the one or more processors 118 to request and/or receive nodes from the node repository server 102, receive and/or request pipeline/knowledge connectors 114 and/or utilities and/or their respective nodes 116 from the node and connector repository server 102, and/or to execute one or more applications, such as a pipeline assembly application 122. Furthermore, the computer-readable instructions stored on the memory 120 may include instructions for carrying out any of the steps of the method 1100, described in greater detail below with respect to FIG. 11.

Generally speaking, executing the pipeline assembly application 122 may include receiving input from users indicating nodes and/or connectors to be included in a pipeline project 124 and assembling a pipeline project 124 based on the indication from the user(s). The pipeline assembly application 122 may store one or more assembled pipeline projects 124 on the memory 120.

A pipeline project 124 may be a collection of nodes and/or sub-pipelines, optionally connected to one another with one or more connectors. Generally speaking, as shown at FIG. 1, a pipeline project 124 may include a project template 126, one or more pipeline/knowledge connectors 128 (which may be, e.g., pipeline/knowledge connectors 114 retrieved from the node and connector repository server 102), and/or one or more utilities and/or their respective nodes (which may be, e.g., utilities and/or respective nodes 116 retrieved from the node and connector repository server 102). For example, a pipeline may be defined as follows:

pipeline=$\{x_1, \ldots, x_m\}$, where $m \geq 1$ and $x$ is either node or pipeline The nodes and connectors may each be re-usable in multiple pipeline projects 124. That is, in some examples, users may request to use existing nodes and/or connectors in a new pipeline, and the pipeline assembly application 122 may access node and connector repository server 102 to access existing nodes and/or connectors to be used in creating a project pipeline 124 based on the user's indications of which nodes and/or connectors should be included in the project pipeline. In some examples, the pipeline assembly application 122 may instantiate existing pipeline/knowledge connectors and/or utilities and/or their respective nodes based on input from the user regarding how the pipeline/knowledge connectors 128 and/or utilities and/or their respective nodes 130 will be used in a given project pipeline 124. Moreover, in some examples, the pipeline assembly application 122 may assemble a pipeline project 124 including two or more existing pipeline projects 124 stored in the memory 120, or including one or more existing pipeline project 124 and one or more additional pipeline/knowledge connectors and/or utilities and/or their respective nodes. Additionally, in some examples, the pipeline assembly application 122 may modify an existing pipeline project 124 by instantiating the pipelines and/or utilities with a different set of user inputs to create a new pipeline project 124, or including one or more existing pipeline project 124 with one or more additional pipeline/knowledge connectors and/or utilities and/or their respective nodes to create a new pipeline project 124.

Once a pipeline project 124 is complete, users can pull or deploy the pipeline project to one or more respective client devices 106. The client devices 106 may each include a user interface 132, one or more processors 134, and a memory 136. The user interface 132 may be configured to receive input and/or requests from users and/or provide information to users. For instances, the user interface 132 may include an interactive display through which users may receive information from the project pipeline 138 and/or provide information to the client device 106. The one or more processors 134 may interact with the memory 136 to obtain, for example, computer-readable instructions stored in the memory 136. The computer-readable instructions stored in the memory 136 may cause the one or more processors 134 to execute and, in some cases, modify, various pipeline projects 138, which were pipeline projects 124 received from the pipeline assembly and repository server 104. Furthermore, the computer-readable instructions stored on the memory 136 may include instructions for carrying out any of the steps of the method 1100, described in greater detail below with respect to FIG. 11.

Executing the pipeline project (module) 138 may include receiving input from a user indicating one or more input parameters to be operated on by the pipeline project 138. Generally speaking, a pipeline project 138 assembled by the pipeline creation application 122 may operate on the one or more input parameters by providing the one or more parameters to the utilities, nodes and connectors of the pipeline in the particular order established when the pipeline was assembled. That is, the pipeline project 138 resolves the value of parameter and passes to a node function during a call. For instance, the pipeline project 138 may provide one or more input parameters to a first node or utility of the pipeline, which may operate on the one or more input parameters to produce one or more output parameters or datasets. A first connector of the pipeline project 138 ordered after the first node may receive the one or more output parameters and provide them to a second node ordered after the first connector, which may in turn operate on these parameters as input parameters in order to produce second output parameters, which may in turn be provided to a second connector ordered after the second node, etc. After all nodes and connectors of the pipeline project 138 have operated on the parameters based on the particular ordering of nodes and connectors in the assembled pipeline project 138, executing the pipeline project 138 may providing the output parameters to the user, e.g., via the user interface 132.

Executing the pipeline project 138 may include resolving the pipeline project 138 as a direct acyclic graph (DAG) during runtime execution, with connectivity between nodes being established through physical data sets. For this reason, sub-pipelines/nodes can be written in various languages, assuming the pipeline orchestration framework (e.g., including one or more connectors) is able to execute sub-pipelines/nodes in different environmental contexts.

Modifying the pipeline project 138 may include modifying any of the project template 140, the pipeline/knowledge connectors 142*a*, and/or the utilities and/or their respective nodes 144 of the project 138. In particular, modifying the pipeline project 138 may include modifying the pipeline/knowledge connectors 142*a* in order to generate customized pipeline/knowledge connectors 142*b*. In some examples, the customized project/knowledge connectors 142*b* may be stored by the memory 136 of the client device 106, while in some examples, the modified connectors 142*b* in pipeline project 138 may eventually be sent to the node and connector repository server 102 to be stored in the memory 112 for future reuse.

Figure 2:
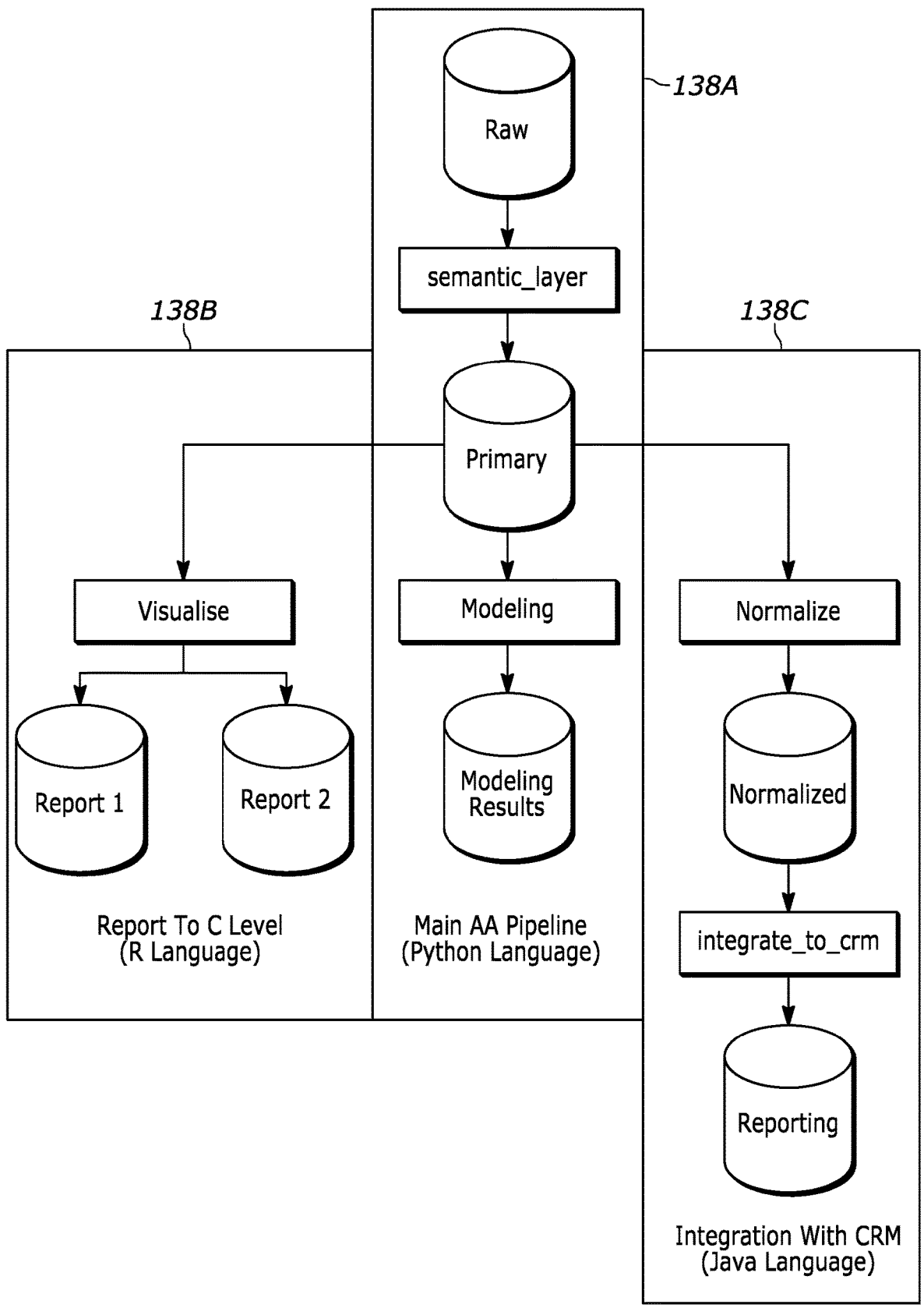
FIG. 2 illustrates an example of analytics pipelines including sub-pipelines written in different programming languages.

In one example, as shown in FIG. 2, a main advanced analytics pipeline may be written entirely in Python, while a senior leadership pipeline 130B may be written entirely in R, i.e., because the organization has a historically strong R quants department, and a backend engineering pipeline 130C may be written entirely in CRM, i.e., because the organization has department of backend engineers responsible for enterprise-level integrations that prefer to write in CRM. These three pipelines 138A, 138B, 138C may be constructed as one DAG pipeline, where nodes are connected through data sets that allows nodes to be written in different languages and be executed in different containers.

Figure 3:
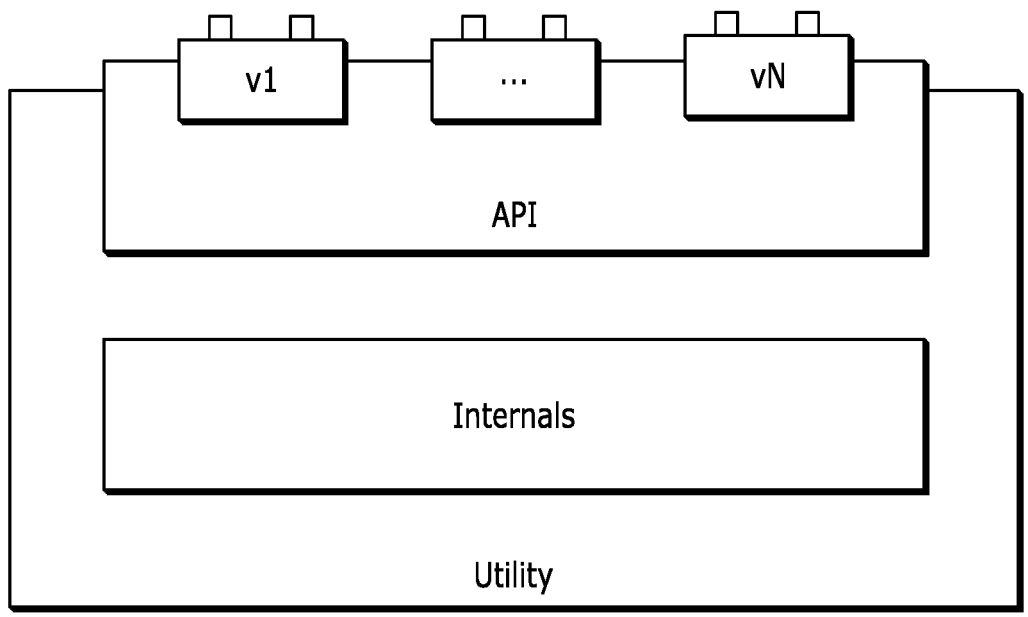
FIG. 3 illustrates an example utility, implemented using the modular software architecture system provided herein, in accordance with some embodiments.

FIG. 3 illustrates an example utility, implemented using the modular software architecture system provided herein, in accordance with some embodiments.

Briefly speaking, the utility is where the code "lives," similar to a Python package, or a directory of Python modules, that follows some specific conventions. However, as discussed above, various utilities can be written in various languages, e.g., with one utility written in Python and another written in JavaScript.

Conceptually, every utility is designed such that it has two layers: a public API and internals. Each public API may include multiple live versions in addition to a version of the utility itself. As an example, a feature generation utility of version 2.1 may provide two versions of a public API: api_v1 and api_v2, where api_v1 has been announced to be deprecated in utility version 3.0. Access to multiple versions, allows enough time for larger projects, including numerous pipelines, to go through smooth iterative migration process rather than trying to migrate all pipelines at once. For instance, a given project may produce models for 5 products in 10 geographic areas, resulting in 50 different combinations. If there are 15 engineers involved in developing and maintaining the overall solution, and they have decided to split into 3 teams, with each team addressing only a single geographic area within a sprint to complete the project, the multi-version API approach makes it easier for the group to split the overall migration plan across multiple sprints, i.e., so that each sprint migrates only parts of the whole solution.

As a note, generally speaking, utilities do not have any configuration, meaning that utilities are used within an application and not used as applications by themselves individually.

Generally speaking, the modular software architecture provided herein differentiates two types of utilities: data utilities and general purpose utilities. A data utility is a special type of utility where public API provides a set of pipeline-integratable nodes. Data utilities may include, e.g., a feature generation utility, a predictive modelling utility, an optimization utility, an entity matching utility, etc. In a nutshell, utility is a collection of nodes, i.e., a collection of building blocks for pipeline construction.

General purpose utilities include any utility that does not qualify to be a data utility. Examples of general purpose utilities may include, e.g., a data lineage utility, an automatic documentation utility, or a "glass" utility, i.e., a pipeline as a configuration utility.

General purpose utilities may be used to extend pipeline execution engine with additional capabilities, may be used alongside a pipeline, or may be used inside nodes. The module software architecture provided herein does not prohibit designing utilities with both characteristics, meaning that an API can be split into a data API that provides nodes, and a general-purpose API that provides other functions for consumption.

Figure 4:
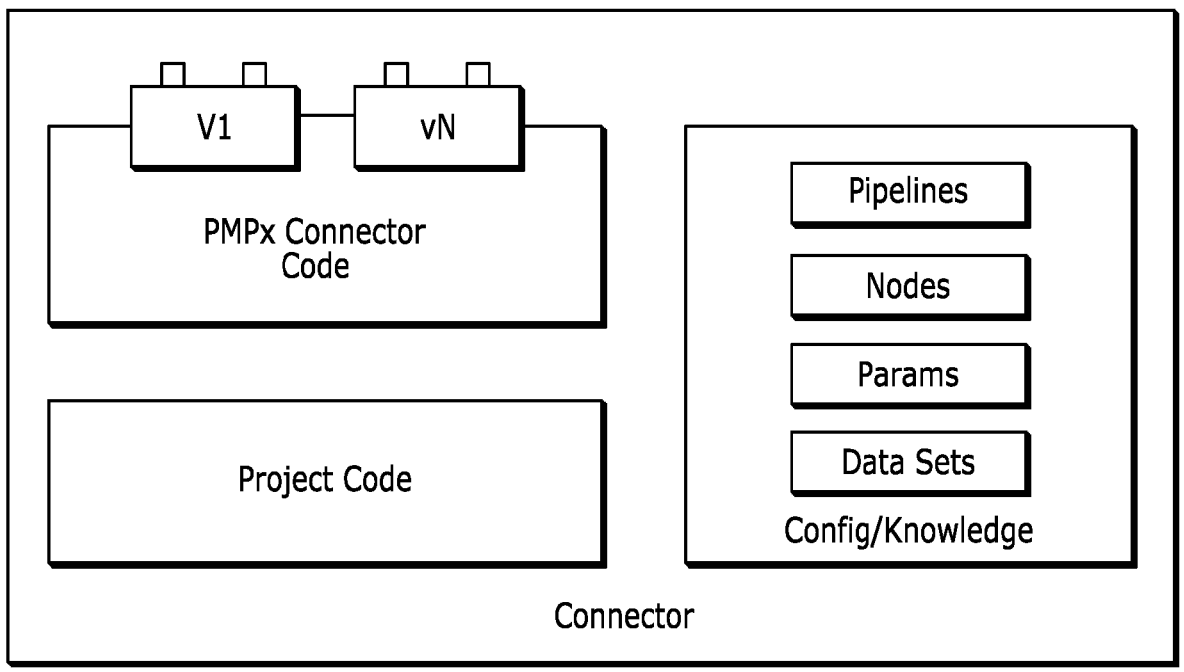
FIG. 4 illustrates an example connector, implemented using the modular software architecture system provided herein, in accordance with some embodiments.

FIG. 4 illustrates an example connector, implemented using the modular software architecture system provided herein, in accordance with some embodiments. Generally speaking, the connector includes instructions of how to stitch nodes from utilities together, what data sets to use and parameters to pass to nodes/models. Connectors are structured to take this into account and include three main sub-components: configuration/"knowledge," i.e., definitions of pipelines, nodes, parameters, data sets, etc., all expressed using a declarative language; connector code, i.e., versioned node API code that is included with the connector and that has not yet matured to be promoted to a "utility"; and project code, i.e., code developed on projects. As a project matures, the connector code and the project code of a given connector may be blank or null, as this code will be available in utilities instead, apart certain types of code that are highly specific to data sources and expected to have high reuse.

Figure 5:
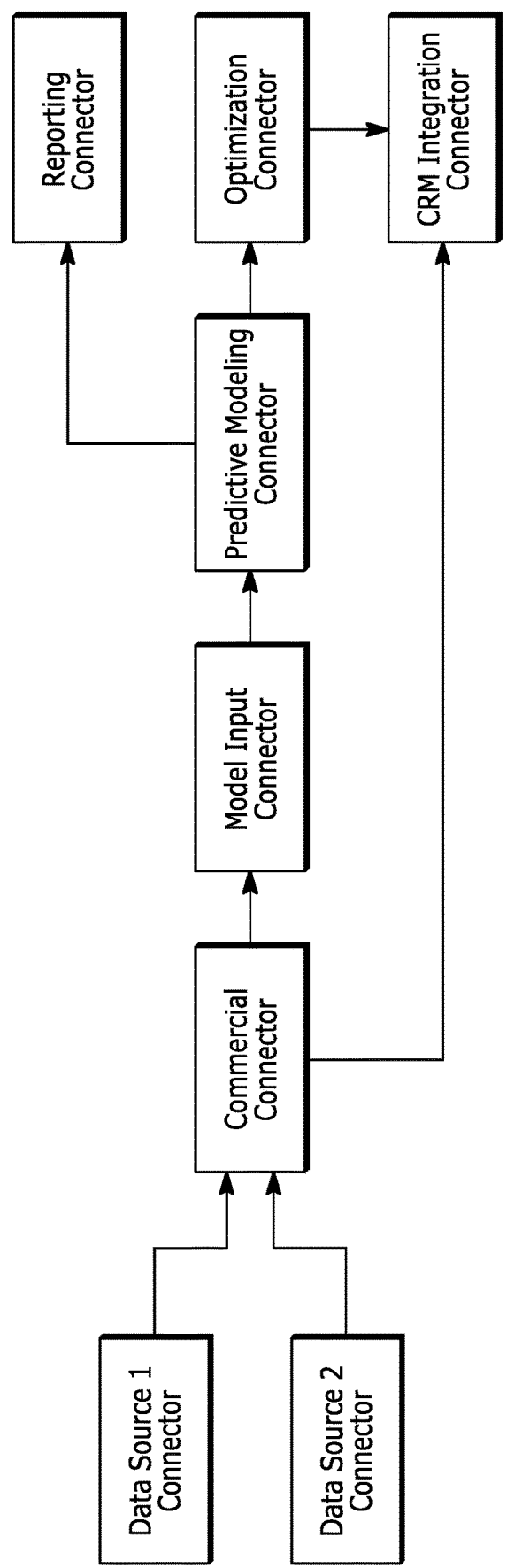
FIG. 5 illustrates a flow diagram of an example pipeline created using the modular software architecture system provided herein, shown using a connector view, in accordance with some embodiments.

Connectors help to split final solution/pipeline into several logical zones of concern. A "connector view" of an example pipeline is presented at FIG. 5. This pipeline can be also represented as node view (see, e.g., FIG. 7 below); however, node view typically contains hundreds of nodes. Therefore, a connector view is more typically utilized for presentation and discussion purposes. While FIG. 5 illustrates a simplified representation of the connector view, in practice, a full connector view would be much richer and comprise connector capabilities, main connectivity interfaces, execution modes, etc. In most cases, a connector view is best presented as a DAG and will not include any loop links among connectors, meaning that inputs to a given connector cannot be based on derivatives of previous outputs of the same connector.

Figure 6:
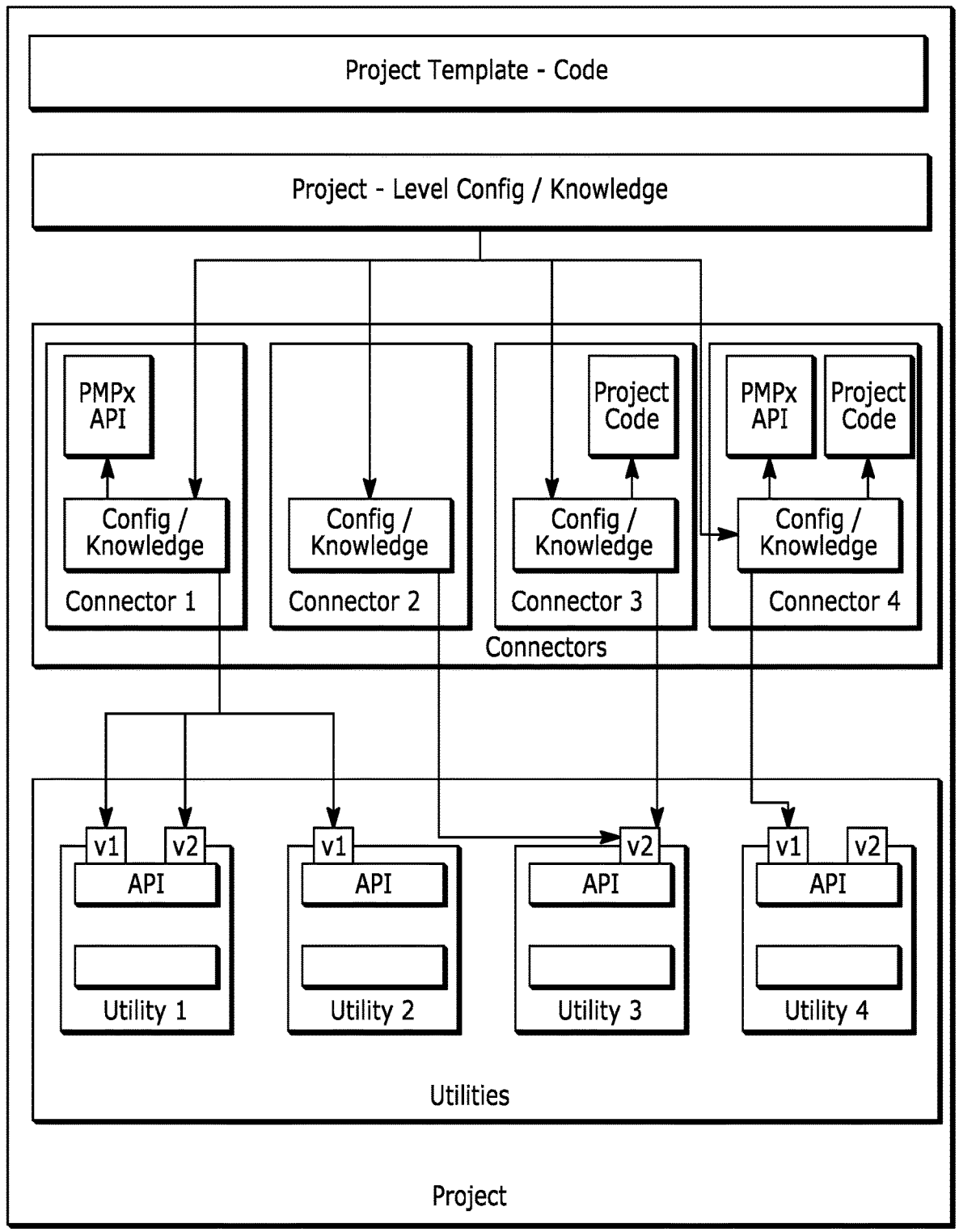
FIG. 6 illustrates an example project including 4 different patterns of connectors that stitch nodes from utilities together using the modular software architecture system provided herein, in accordance with some embodiments.

FIG. 6 illustrates a project including connectors that stitch nodes from utilities together using the modular software architecture system provided herein, in accordance with some embodiments. Generally speaking, a project typically includes several connectors that stitch nodes from utilities together. Connectors and utilities may be copied to a project template that additionally includes project-level configuration.

As shown in FIG. 6, there are four data connectors that depend on utilities and code inside them. Connector 1 is a data connector with some data source specific code encapsulated inside, and provides some transformations based on DE utilities. Connector 1 relies on both v1 and v2 of the utility, for example, because at this point it may going through a migration process. Connector 2, on the other hand, relies only on utility code. For instance, Connector 2 may be a predictive modelling connector. Connector 3 is similar to Connector 2, with the difference that a project team decided to implement additional functionality or replace existent utility functionality. For instance, Connector 3 may be an optimization connector where a project team decided to extend the capabilities of constraints framework. Finally, Connector 4 includes both Asset and Project code. In the case of Connector 4, the Asset code may not have matured enough to be promoted to utilities yet. Utility 4 that connector 4 uses has exposed two API versions, however Connector 4 has not yet migrated to v2.

Figure 7:
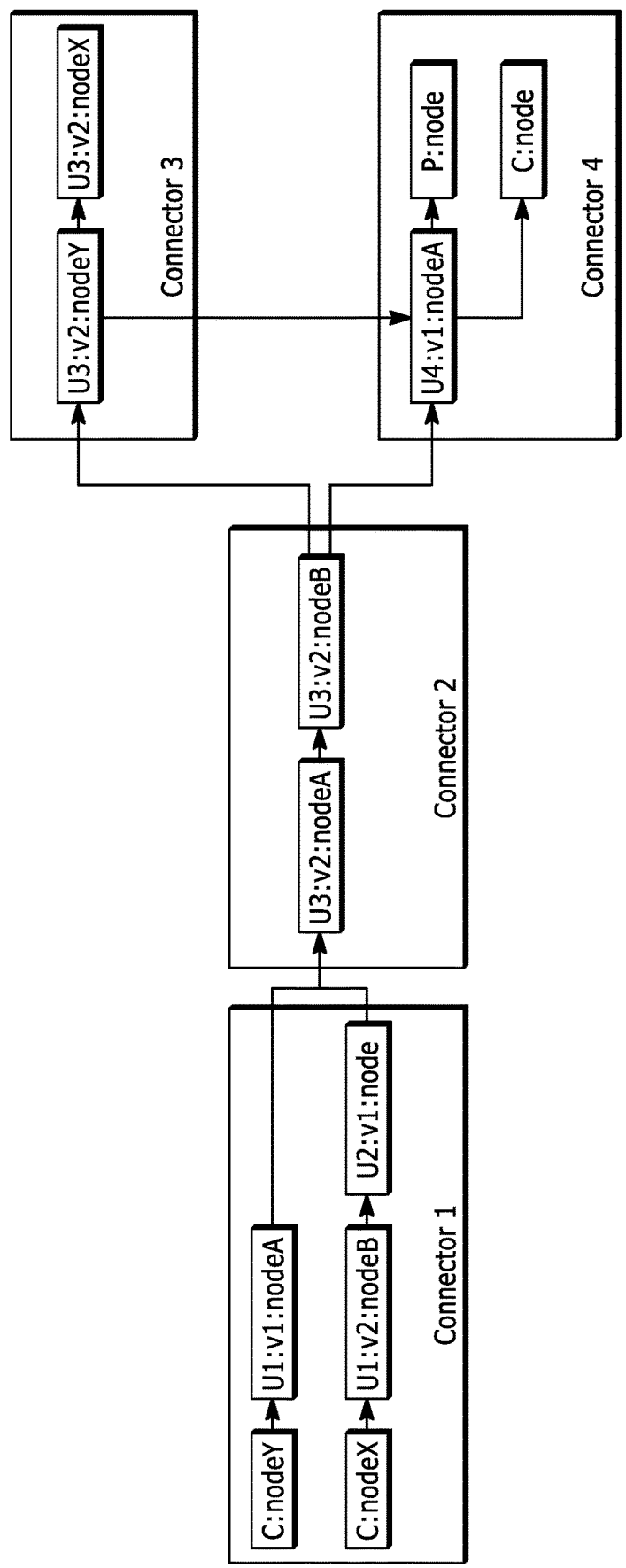
FIG. 7 illustrates a flow diagram of an another example project created using the modular software architecture system provided herein, shown using a node view, in accordance with some embodiments.

It is important to note that utilities contain logic and do not have "knowledge", connectors cannot reference other connectors, and connectors can reference multiple utilities. Asset code without connectors is expected to be versioned too, however for simplicity's sake, this complexity was removed from the diagram as the principle is the same as with utilities The same project can be represented with additional detail using node view, as shown at FIG. 7. Generally speaking, as shown in FIG. 7, nodes follow a component:version:node naming convention, with "c" indicating an in-built asset code in connector, "P" indicating project code, and "U" indicating utility code.

Figure 8:
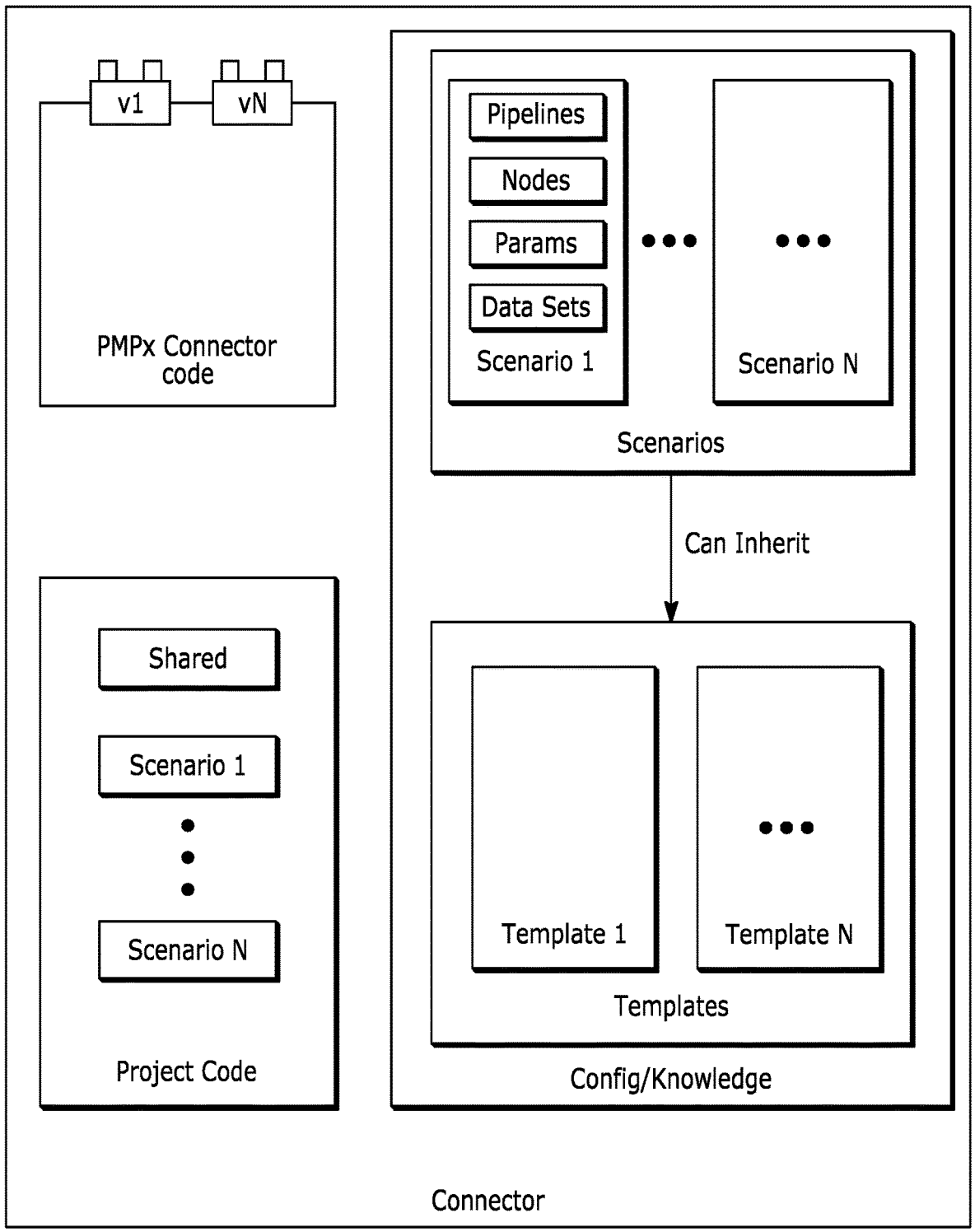
FIG. 8 illustrates an example of multiple configurations that can be supported using connectors of the modular software architecture system provided herein, in accordance with some embodiments.

FIG. 8 illustrates an example of multiple configurations that can be supported using connectors of the modular software architecture system provided herein, in accordance with some embodiments. For instance, a scale-up project is a special type of project that needs to support several scenarios. For example, in the situation to deploy commercial analytics, a single-scenario project would present analysis done for a particular product in a particular country, and a scale-up project would involve analysis across multiple brands and multiple countries. For example, if 5 products are being sold in 7 countries, then there will be 35 combinations that technically will translate in 35 single-scenario pipelines.

There are several main challenges: namely, how to ensure that code and configuration can be re-used within a project so that it is easily manageable, how to ensure incorporation of differences between countries (i.e., either simple parameters or whole new data sources), and whether it is possible to execute all of these scenarios at the same time so that outputs of these scenarios can be consolidated and analyzed. To solve these challenges, the present disclosure provides connectors that can support multiple configurations, as shown in FIG. 8.

That is, as shown in FIG. 8, each connector can have multiple scenario configurations. To reduce amount of configuration that is required, scenarios can inherit from templates so common parts across scenarios can be decoupled and used in multiple scenarios, and code produced throughout a project can be decoupled by scenario and shared. Scenarios can be processed either in isolation or together, assuming their configuration uses unique namespaces.

Figure 9:
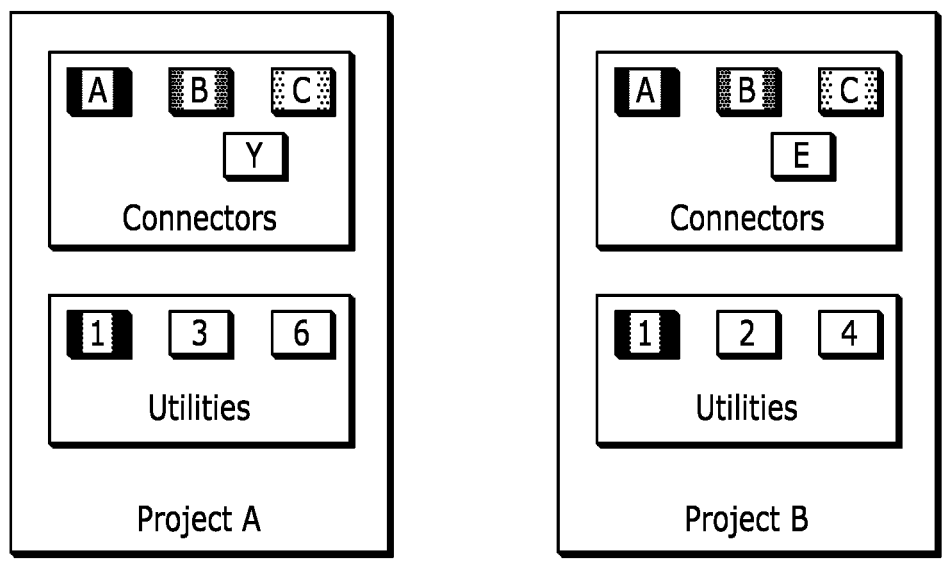
FIG. 9 illustrates an example of transferability of components, such as connectors and utilities, between projects created using the modular software architecture system provided herein, in accordance with some embodiments.

FIG. 9 illustrates an example of transferability between components, such as connectors and utilities, of a pipeline created using the modular software architecture system provided herein, in accordance with some embodiments. That is, as discussed above, one of the important principles that this architecture follows is transferability principle, meaning that both types of components (i.e., connector and utility) are self-sufficient and can be transferred from one project to another project. For example, an internal data connector developed on project A for client A, can be used on all subsequent projects for client A. Moreover, large portions of connectors are client-agnostic and can be used across clients. This principle is illustrated at FIG. 9, where project A and project B share connectors A and B (e.g., data connectors) and utility 1. Moreover, as connectors are configurable knowledge, it is possible to copy connectors from project A to project B and then re-configure parts of it to adapt to project B needs. For example, connector C has been copied from project A to project B and has been reconfigured.

Figure 10:
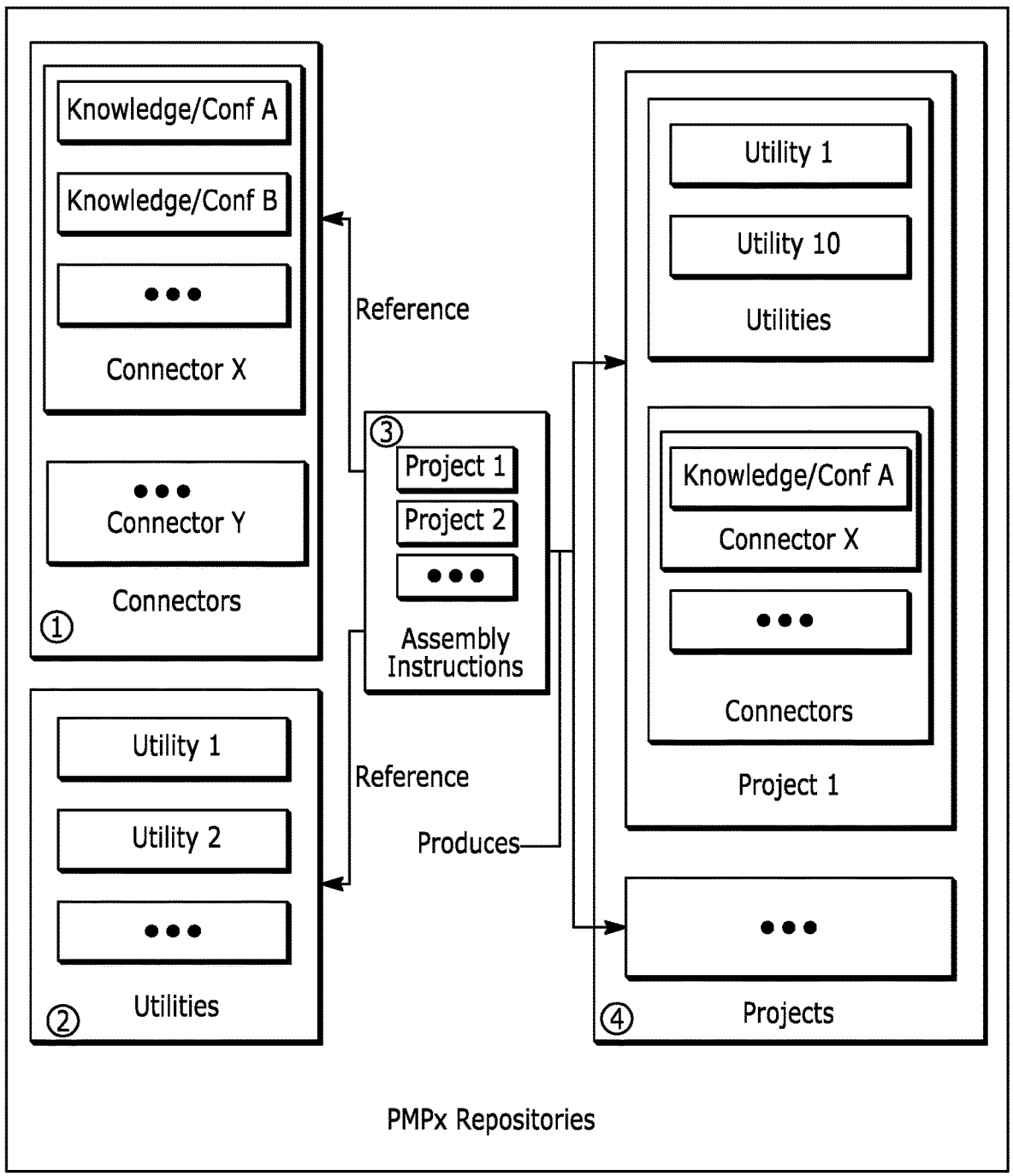
FIG. 10 illustrates another example of transferability between components, such as connectors and utilities, of a pipeline created using the modular software architecture system provided herein, in accordance with some embodiments.

FIG. 10 illustrates another example of transferability between components, such as connectors and utilities, of a pipeline created using the modular software architecture system provided herein, in accordance with some embodiments.

Generally speaking, the analytics modular component ecosystem is where components are stored and developed. The components are assembled into "projects", verified, and shipped to client service teams as pipelines that the client services teams later deploy and integrate their internal data sources to. A analytics modular component ecosystem includes the following parts: a repository of utilities, a repository of pre-configured connectors, a script to assemble a project from the repository of utilities and the repository of pre-configured connectors for development (based on symlinks) or production (copy), a repository of end-to-end projects assembled from the repository of utilities and the repository of pre-configured connectors using the script, and continuous integration/continuous delivery (CI/CD) for testing utilities, connectors, and whole pipelines. Using the transferability principle discussed above with respect to FIG. 9, the utilities/connectors of FIG. 10 may form projects and/or can be transferred as is to other projects.

Generally speaking, assembly instructions are done per project and reference which connectors (and what exact configuration) and utilities should go to a particular project, and pre-made projects can be consumed by client service teams as day-1 pipelines. In some examples, this system is used to co-develop deliverables for various Life Sciences analytics use cases, e.g., Site Selection, Commercial Engagement, Real World Data Analysis, Manufacturing, etc. Moreover, this repository/assembly system can be used by clients to manage development of their environments, and can be used as an alternative approach for scale-up projects.

Figure 11:
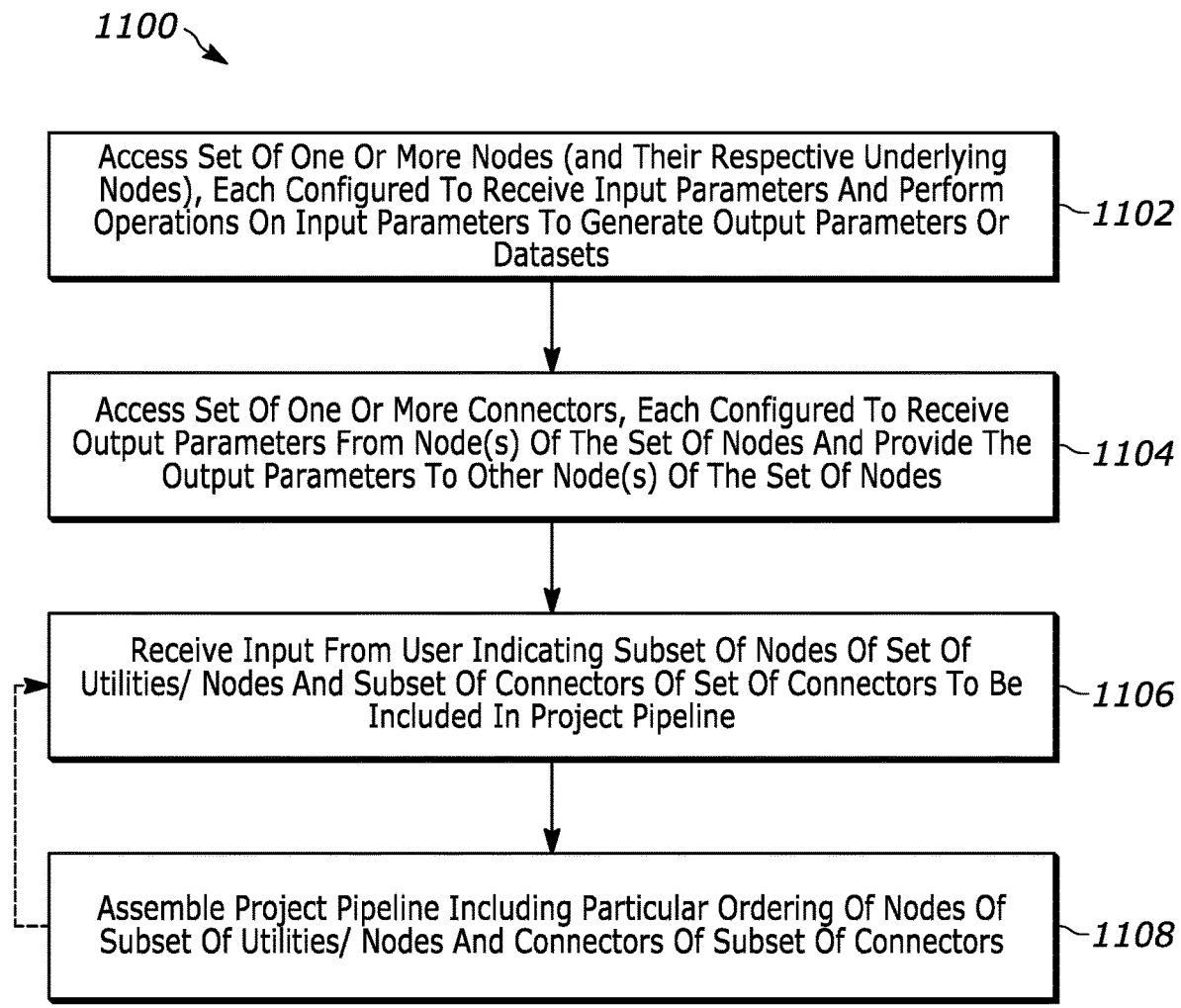
FIG. 11 illustrates a flow diagram of an example method of implementing the module software architecture system provided herein, in accordance with some embodiments.

FIG. 11 illustrates a flow diagram of an example method 1100 of implementing an example modular software architecture system, in accordance with some embodiments. One or more steps of the method 1100 may be implemented as a set of "assembly" instructions (122) stored on a computer-readable memory (e.g., memory 112, memory 120, memory 136, etc.) and executable on one or more processors (e.g., processors 110, 118, 134, etc.).

The method 1100 may include accessing (block 1102) a set of utilities in which each utility can contain one or more nodes. When operating in a pipeline, each of the nodes may be configured to receive at least one input parameter and perform at least one operation to generate at least one output parameter. In the event we reuse the same node in the utility for a different pipeline, the given node may operate on more than one input parameters to generate more than one or more output parameters. Within the set of nodes, various nodes can utilize different programming languages to operate on their respective input parameters. That is, a first node in the set of nodes may operate on several first input parameters using a first programming language to produce several first output parameters, and a second node in the set of nodes may operate on a second input parameter using a second programming language to produce a second output parameter, and a third node in the set of nodes may operate on a plurality of third input parameters using a third programming language to produce a third output parameter, etc.

Additionally, the method 1100 may include assembling (block 1104) a set of one or more connectors. When operating in a pipeline, each of the connectors may be configured to connect nodes to one another, i.e., by receiving one or more output parameters from one node and providing one or more output parameters to other nodes as input parameters. In some examples, the connectors may be configured to perform their own operations on received parameter(s) before providing the parameter(s) to the next node. Furthermore, in some examples, the connectors may be configured to connect (i.e., receive output parameters from and provide input parameters to) various nodes operating in different programming languages. That is, a first node may operate on one or more first input parameters using a first programming language to generate one or more first output parameters. A connector may receive at least one of the one or more first output parameters and may provide the at least one first output parameter to a second node as an input parameter. The second node may in turn operate on the input parameter (i.e., the first output parameter from the first node) using a second programming language to generate one or more second output parameters.

Furthermore, the method 1100 may include receiving (block 1106) input from a user indicating a subset of utilities (each utility containing its own subset of one or more nodes), and a subset of connectors, to be included in a pipeline. That is, a user may select one or more utilities and how its nodes are configured accessed by the method 1100 at block 1102, and may select one or more connectors of the set of one or more connectors accessed by the method 1100 at block 1104, to be included in the pipeline. In some examples, the user may also select a preferred order of the nodes and connectors. Additionally, in some examples, the user may simply select one or more nodes without specifying which connectors should be used to connect the nodes.

The method 1100 may further include assembling (block 1108) the pipeline. The pipeline may include a particular ordering of the nodes of the subset of nodes in their respective utilities and the connectors of the subset of connectors. In some examples, a single pipeline may include multiple nodes that operate in different programming languages. Additionally, in some examples, the user may provide a preferred order for the nodes and connectors to be included in the pipeline, while in other examples, assembling the pipeline may include determining the order in which the nodes and connectors should be placed. Moreover, in some examples, the user may select both nodes and connectors to be included in the pipeline, while in other examples, the user may not specify which connectors should be included, and assembling the pipeline may include determining which connectors will be included in the pipeline to connect any selected nodes.

In some examples, the method 1100 may further include repeating receiving (i.e., repeating block 1106) input from the user indicating a second subset of nodes from the set of one or more utilities or nodes, and a second subset of connectors of the set of one or more connectors, to be included in a second pipeline and assembling the second pipeline. That is, both the first pipeline and the second pipeline may be assembled using nodes from the set of nodes accessed at block 1102 and connectors from the set of connectors accessed at block 1104. The second pipeline may include a particular ordering of the nodes of the second subset of nodes, and the connectors of the second subset of connectors. In some examples, the first subset of utilities or its nodes may include at least one node in common with the second subset of utilities or its nodes. Similarly, in some examples, the first subset of connectors may include at least one connector in common with the second subset of connectors. This process may be repeated to assemble any number of pipelines including various nodes and connectors from the sets of nodes and connectors.

Furthermore, in some examples, the method 1100 may include assembling a pipeline including two or more existing pipelines in a particular order. Additionally, in some examples, a pipeline may be assembled using one or more existing pipelines along with additional nodes from the set of nodes and/or additional connectors from the set of connectors, in a particular order.

Additionally, in some examples, the method 1100 may include receiving input from a user indicating one or more input parameters to be operated on by a pipeline. A pipeline assembled at block 1108 may operate on the one or more input parameters by providing the one or more parameters to the nodes and connectors of the pipeline in the particular order established when the pipeline was assembled. For instance, the one or more input parameters may be provided to a first node of the pipeline, which may operate on the one or more input parameters to produce one or more output parameters. A first connector of the pipeline ordered after the first node may receive the one or more output parameters and provide them to a second node ordered after the first connector, which may in turn operate on these parameters as input parameters in order to produce second output parameters, which may in turn be provided to a second connector ordered after the second node, etc. After all nodes and connectors of the pipeline have operated on the parameters based on the particular ordering of nodes and connectors, output parameters or dataset of the pipeline may be generated and provided to the user.

Definitions

Analytics Product team: a team that creates utilities, connectors and a project pipeline.

Analytics Project Team: a team that takes a specific project pipeline and further customizes the project pipeline for its own deliverables.

Connector Knowledge:={Nodes . . . , Parameters . . . , DataSets . . . , Pipelines . . . }, where nodes, parameters, data sets and pipelines are expressed using declarative human and machine understandable language.

ConnectorAssetCode: code that is produced by an analytics product team, versioned and shipped to a project and that cannot be modified by any means by an analytics project team. Part of a connector.

UtilityAssetCode: code that is produced by an analytics product team, versioned and shipped to a project and that cannot be modified by any means by an analytics project team. Part of an utility.

Project Code: code that is produced during the project. In a long run, all code will be shipped as part of assets (i.e. connector or utilities), and nothing will be produced on projects.

Connector:={ConnectorKnowledge,ConnectorAssetCode,ProjectCode}

Utility:={UtilityAssetCode}

Repository Definitions

A vertical repository that stores all utilities, project templates and all possible connectors (with their configurations) may be defined as follows:

Repository:={Connector . . . ,Utility . . . ,ProjectTemplate . . . }

The definition of the repository may be rewritten as follows:

Repository:={KnowledgeRepository . . . ,AssetRepository . . . }, where

KnowledgeRepository:={Connector Knowledge . . . } knowledge from all connectors, and AssetRepository:={ConnectorAssetCode . . . , UtilityAssetCode . . . , ProjectTemplate . . . }, all code that is shipped as part of vertical.

Generally speaking, the architecture provided herein may ensure that the following rules are always true:

Rule 1: A runnable project pipeline can be produced out of Knowledge, assuming Assets is a commodity.

Project:=project(KnowledgeRepository,AssetRepository,ProjectCode)

The formula above would initially include custom project code that would be expected to disappear in the long run, resulting in the following formula:

Project:=project(KnowledgeRepository,AssetRepository)

Rule 2: Knowledge can be easily decoupled from any Project, assuming Assets (i.e. utility or connector) is a commodity.

Knowledge,ProjectCode:=knowledge(Project)

The formula above would initially include custom project code that would be expected to disappear in the long run, resulting in the following formula:

Knowledge:=knowledge(Project)

Rule 3: Rule 1 and Rule 2 both exist in usual environments where insights can be generated from data and runnable projects.

Insights:=run(Project,Data)

Advantageously, this architecture provides three large areas of opportunities:
1. Development of simultaneous projects using same components and repositories
2. Ability to differentiate asset and project code—maintenance/support business of delivered projects by ability to upgrade components
3. Decoupling of Knowledge that provides opportunity to apply meta-analysis on top of projects; assuming assets is a commodity—reproduce workable code from any past Knowledge; or even combine knowledge together and generate a new variation of a project. It's important to mention—Later this declarative language can further evolve and be much more precise and human friendly The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

1. A computer system, comprising: one or more processors; and a non-transitory computer-readable memory coupled to the one or more processors and storing instructions thereon that, when executed by the one or more processors, cause the computer system to: access a set of one or more utilities and respective underlying nodes, wherein each node is configured to: receive at least one input parameter; and perform at least one operation on the at least one input parameter to generate at least one output parameter; access a set of one or more connectors, wherein each connector is configured to: receive at least one output parameter from a node of the set of one or more nodes; and provide the at least one output parameter from the node of the set of one or more nodes to another node of the set of one or more nodes; receive input from a user indicating a first subset of nodes of the set of one or more nodes, and a first subset of connectors of the set of one or more connectors, to be included in a pipeline; and assemble the pipeline, the pipeline including a particular ordering of the nodes of the first subset of nodes and the connectors of the first subset of connectors.

2. The computer system of aspect 1, wherein the pipeline is a first pipeline, and wherein the instructions, when executed by the one or more processors, further cause the computer system to: receive input from a user indicating a second subset of utilities of the set of one or more utilities and respective underlying nodes, and a second subset of connectors of the set of one or more connectors, to be included in a second pipeline; and assemble the second pipeline, the pipeline including a particular ordering of the nodes of the second subset of nodes and the connectors of the second subset of connectors.

3. The computer system of aspect 2, wherein the first subset of nodes has at least one node in common with the second subset of nodes.

4. The computer system of any one of aspects 1 or 2, wherein the first subset of connectors has at least one connector in common with the second subset of connectors.

5. The computer system of any one of aspects 1-4, wherein the pipeline includes a first node of the set of one or more nodes and a second node of the set of one or more nodes, and a connector of the set of one or more connectors, wherein the first node is configured to utilize a first programming language to perform a first operation on a first input parameter to generate a first output parameter, wherein the connector is configured to provide the first output parameter to the second node as a second input parameter, and wherein the second node is configured to utilize a second programming language to perform a second operation on the second input parameter to generate a second output parameter.

6. The computer system of any one of aspects 1-5, wherein the instructions, when executed by the one or more processors, further cause the computer system to: receive input from a user indicating at least a first pipeline and a second pipeline, to be included in a third pipeline; and assemble the third pipeline, the third pipeline including a particular ordering of the first pipeline and the second pipeline.

7. The computer system of any one of aspects 1-6, wherein the instructions, when executed by the one or more processors, further cause the computer system to: receive input from a user indicating one or more input parameters selected by the user; operate the pipeline on the one or more input parameters by providing the one or more input parameters to the pipeline based on the particular ordering of the nodes of the first subset of nodes and the connectors of the first subset of connectors; determine one or more output parameters based on operating the pipeline on the one or more input parameters; and provide, to the user, the one or more output parameters determined based on operating the pipeline on the one or more input parameters.

8. A computer-implemented method, comprising: accessing, by one or more processors, a set of one or more utilities and respective underlying nodes, wherein each node is configured to: receive at least one input parameter; and perform at least one operation on the at least one input parameter to generate at least one output parameter; accessing, by the one or more processors, a set of one or more connectors, wherein each connector is configured to: receive at least one output parameter from a node of the set of one or more nodes; and provide the at least one output parameter from the node of the set of one or more nodes to another node of the set of one or more nodes; receiving, by the one or more processors, input from a user indicating a first subset of nodes of the set of one or more nodes, and a first subset of connectors of the set of one or more connectors, to be included in a pipeline; and assembling, by the one or more processors, the pipeline, the pipeline including a particular ordering of the nodes of the first subset of nodes and the connectors of the first subset of connectors.

9. The computer-implemented method of aspect 8, wherein the pipeline is a first pipeline, the computer-implemented method further comprising: receiving, by the one or more processors, input from a user indicating a second subset of nodes of the set of one or more nodes, and a second subset of connectors of the set of one or more connectors, to be included in a second pipeline; and assembling, by the one or more processors, the second pipeline, the pipeline including a particular ordering of the nodes of the second subset of nodes and the connectors of the second subset of connectors.

10. The computer-implemented method of aspect 9, wherein the first subset of utilities or respective underlying nodes has at least one node in common with the second subset of utilities or respective underlying nodes.

11. The computer-implemented method of any one of aspects 9 or 10, wherein the first subset of connectors has at least one connector in common with the second subset of connectors.

12. The computer-implemented method of any one of aspects 9-11, wherein the pipeline includes a first node of the set of one or more nodes and a second node of the set of one or more nodes, and a connector of the set of one or more connectors, wherein the first node is configured to utilize a first programming language to perform a first operation on a first input parameter to generate a first output parameter, wherein the connector is configured to provide the first output parameter to the second node as a second input parameter, and wherein the second node is configured to utilize a second programming language to perform a second operation on the second input parameter to generate a second output parameter.

13. The computer-implemented method of any one of aspects 8-12, further comprising: receiving, by the one or more processors, input from a user indicating at least a first pipeline and a second pipeline, to be included in a third pipeline; and assembling, by the one or more processors, the third pipeline, including a particular ordering of the first pipeline and the second pipeline.

14. The computer-implemented method of any one of aspects 8-13, further comprising: receiving, by the one or more processors, input from a user indicating one or more input parameters selected by the user; operating, by the one or more processors, the pipeline on the one or more input parameters by providing the one or more input parameters to the pipeline based on the particular ordering of the nodes of the first subset of nodes and the connectors of the first subset of connectors; determining, by the one or more processors, one or more output parameters based on operating the pipeline on the one or more input parameters; and providing, by the one or more processors, to the user, the one or more output datasets or parameters determined based on operating the pipeline on the one or more input parameters.

15. A non-transitory computer-readable medium coupled to one or more processors and storing instructions thereon that, when executed by the one or more processors, cause the one or more processors to: access a set of one or more utilities and respective underlying nodes, wherein each node is configured to: receive at least one input parameter; and perform at least one operation on the at least one input parameter to generate at least one output parameter; access a set of one or more connectors, wherein each connector is configured to: receive at least one output parameter from a node of the set of one or more nodes; and provide the at least one output parameter from the node of the set of one or more nodes to another node of the set of one or more nodes; receive input from a user indicating a first subset of nodes of the set of one or more nodes, and a first subset of connectors of the set of one or more connectors, to be included in a pipeline; and assemble the pipeline, the pipeline including a particular ordering of the nodes of the first subset of nodes and the connectors of the first subset of connectors.

16. The non-transitory computer-readable medium of aspect 15, wherein the pipeline is a first pipeline, and wherein the instructions, when executed by the one or more processors, further cause the one or more processors to: receive input from a user indicating a second subset of nodes of the set of one or more nodes, and a second subset of connectors of the set of one or more connectors, to be included in a second pipeline; and assemble the second pipeline, the pipeline including a particular ordering of the nodes of the second subset of nodes and the connectors of the second subset of connectors.

17. The non-transitory computer-readable medium of aspect 16, wherein the first subset of nodes has at least one utilities or respective underlying node in common with the second subset of utilities or respective underlying nodes.

18. The non-transitory computer-readable medium of any one of aspects 16 or 17, wherein the first subset of connectors has at least one connector in common with the second subset of connectors.

19. The non-transitory computer-readable medium of any one of aspects 15-18, wherein the pipeline includes a first node of the set of one or more nodes and a second node of the set of one or more nodes, and a connector of the set of one or more connectors, wherein the first node is configured to utilize a first programming language to perform a first operation on a first input parameter to generate a first output parameter, wherein the connector is configured to provide the first output parameter to the second node as a second input parameter, and wherein the second node is configured to utilize a second programming language to perform a second operation on the second input parameter to generate a second output parameter.

20. The non-transitory computer-readable medium of any one of aspects 15-19, wherein the instructions, when executed by the one or more processors, further cause the one or more processors to: receive input from a user indicating at least a first pipeline and a second pipeline, to be included in a third pipeline; and assemble the third pipeline, the third pipeline including a particular ordering of the first pipeline and the second pipeline.

What is claimed is:

1. A computer system, comprising:
   one or more processors; and
   a non-transitory computer-readable memory coupled to the one or more processors and storing instructions thereon that, when executed by the one or more processors, cause the computer system to:
   access a set of one or more utilities and respective underlying nodes, wherein each node is configured to:
   receive at least one input parameter; and
   perform at least one operation on the at least one input parameter to generate at least one output parameter;
   access a set of one or more connectors, wherein each connector is configured to:
   receive at least one output parameter from a node of the set of one or more nodes; and
   provide the at least one output parameter from the node of the set of one or more nodes to another node of the set of one or more nodes;
   receive input from a user indicating a first subset of nodes of the set of one or more nodes, and a first subset of connectors of the set of one or more connectors, to be included in a pipeline; and
   assemble the pipeline, the pipeline including a particular ordering of the nodes of the first subset of nodes and the connectors of the first subset of connectors.

2. The computer system of claim 1, wherein the pipeline is a first pipeline, and wherein the instructions, when executed by the one or more processors, further cause the computer system to:
   receive input from a user indicating a second subset of utilities of the set of one or more utilities and respective underlying nodes, and a second subset of connectors of the set of one or more connectors, to be included in a second pipeline; and
   assemble the second pipeline, the pipeline including a particular ordering of the nodes of the second subset of nodes and the connectors of the second subset of connectors.

3. The computer system of claim 2, wherein the first subset of nodes has at least one node in common with the second subset of nodes.

4. The computer system of claim 2, wherein the first subset of connectors has at least one connector in common with the second subset of connectors.

5. The computer system of claim 1, wherein the pipeline includes a first node of the set of one or more nodes and a second node of the set of one or more nodes, and a connector of the set of one or more connectors,
wherein the first node is configured to utilize a first programming language to perform a first operation on a first input parameter to generate a first output parameter,
wherein the connector is configured to provide the first output parameter to the second node as a second input parameter, and
wherein the second node is configured to utilize a second programming language to perform a second operation on the second input parameter to generate a second output parameter.

6. The computer system of claim 1, wherein the instructions, when executed by the one or more processors, further cause the computer system to:
   receive input from a user indicating at least a first pipeline and a second pipeline, to be included in a third pipeline; and
   assemble the third pipeline, the third pipeline including a particular ordering of the first pipeline and the second pipeline.

7. The computer system of claim 1, wherein the instructions, when executed by the one or more processors, further cause the computer system to:
   receive input from a user indicating one or more input parameters selected by the user;
   operate the pipeline on the one or more input parameters by providing the one or more input parameters to the pipeline based on the particular ordering of the nodes of the first subset of nodes and the connectors of the first subset of connectors;
   determine one or more output parameters based on operating the pipeline on the one or more input parameters; and
   provide, to the user, the one or more output parameters determined based on operating the pipeline on the one or more input parameters.

8. A computer-implemented method, comprising:
   accessing, by one or more processors, a set of one or more utilities and respective underlying nodes, wherein each node is configured to:
   receive at least one input parameter; and
   perform at least one operation on the at least one input parameter to generate at least one output parameter;
   accessing, by the one or more processors, a set of one or more connectors, wherein each connector is configured to:
   receive at least one output parameter from a node of the set of one or more nodes; and
   provide the at least one output parameter from the node of the set of one or more nodes to another node of the set of one or more nodes;
   receiving, by the one or more processors, input from a user indicating a first subset of nodes of the set of one or more nodes, and a first subset of connectors of the set of one or more connectors, to be included in a pipeline; and
   assembling, by the one or more processors, the pipeline, the pipeline including a particular ordering of the nodes of the first subset of nodes and the connectors of the first subset of connectors.

9. The computer-implemented method of claim 8, wherein the pipeline is a first pipeline, the computer-implemented method further comprising:
   receiving, by the one or more processors, input from a user indicating a second subset of nodes of the set of one or more nodes, and a second subset of connectors of the set of one or more connectors, to be included in a second pipeline; and assembling, by the one or more processors, the second pipeline, the pipeline including a particular ordering of the nodes of the second subset of nodes and the connectors of the second subset of connectors.

10. The computer-implemented method of claim 9, wherein the first subset of utilities or respective underlying nodes has at least one node in common with the second subset of utilities or respective underlying nodes.

11. The computer-implemented method of claim 9, wherein the first subset of connectors has at least one connector in common with the second subset of connectors.

12. The computer-implemented method of claim 8, wherein the pipeline includes a first node of the set of one or more nodes and a second node of the set of one or more nodes, and a connector of the set of one or more connectors, wherein the first node is configured to utilize a first programming language to perform a first operation on a first input parameter to generate a first output parameter, wherein the connector is configured to provide the first output parameter to the second node as a second input parameter, and wherein the second node is configured to utilize a second programming language to perform a second operation on the second input parameter to generate a second output parameter.

13. The computer-implemented method of claim 8, further comprising:

receiving, by the one or more processors, input from a user indicating at least a first pipeline and a second pipeline, to be included in a third pipeline; and assembling, by the one or more processors, the third pipeline, including a particular ordering of the first pipeline and the second pipeline.

14. The computer-implemented method of claim 8, further comprising:

receiving, by the one or more processors, input from a user indicating one or more input parameters selected by the user;

operating, by the one or more processors, the pipeline on the one or more input parameters by providing the one or more input parameters to the pipeline based on the particular ordering of the nodes of the first subset of nodes and the connectors of the first subset of connectors;

determining, by the one or more processors, one or more output parameters based on operating the pipeline on the one or more input parameters; and providing, by the one or more processors, to the user, the one or more output datasets or parameters determined based on operating the pipeline on the one or more input parameters.

15. A non-transitory computer-readable medium coupled to one or more processors and storing instructions thereon that, when executed by the one or more processors, cause the one or more processors to:

access a set of one or more utilities and respective underlying nodes, wherein each node is configured to:

receive at least one input parameter; and perform at least one operation on the at least one input parameter to generate at least one output parameter;

access a set of one or more connectors, wherein each connector is configured to:

receive at least one output parameter from a node of the set of one or more nodes; and provide the at least one output parameter from the node of the set of one or more nodes to another node of the set of one or more nodes;

receive input from a user indicating a first subset of nodes of the set of one or more nodes, and a first subset of connectors of the set of one or more connectors, to be included in a pipeline; and assemble the pipeline, the pipeline including a particular ordering of the nodes of the first subset of nodes and the connectors of the first subset of connectors.

16. The non-transitory computer-readable medium of claim 15, wherein the pipeline is a first pipeline, and wherein the instructions, when executed by the one or more processors, further cause the one or more processors to:

receive input from a user indicating a second subset of nodes of the set of one or more nodes, and a second subset of connectors of the set of one or more connectors, to be included in a second pipeline; and assemble the second pipeline, the pipeline including a particular ordering of the nodes of the second subset of nodes and the connectors of the second subset of connectors.

17. The non-transitory computer-readable medium of claim 16, wherein the first subset of nodes has at least one utilities or respective underlying node in common with the second subset of utilities or respective underlying nodes.

18. The non-transitory computer-readable medium of claim 16, wherein the first subset of connectors has at least one connector in common with the second subset of connectors.

19. The non-transitory computer-readable medium of claim 15, wherein the pipeline includes a first node of the set of one or more nodes and a second node of the set of one or more nodes, and a connector of the set of one or more connectors, wherein the first node is configured to utilize a first programming language to perform a first operation on a first input parameter to generate a first output parameter, wherein the connector is configured to provide the first output parameter to the second node as a second input parameter, and wherein the second node is configured to utilize a second programming language to perform a second operation on the second input parameter to generate a second output parameter.

20. The non-transitory computer-readable medium of claim 15, wherein the instructions, when executed by the one or more processors, further cause the one or more processors to:

receive input from a user indicating at least a first pipeline and a second pipeline, to be included in a third pipeline; and assemble the third pipeline, the third pipeline including a particular ordering of the first pipeline and the second pipeline.

* * * * *

(12) EX PARTE REEXAMINATION CERTIFICATE (243rd)
United States Patent
Drapeko et al.

Ex Parte Reexamination Ordered under 35 U.S.C. 257

(10) Number: US 11,586,432 C1
(45) Certificate Issued: Apr. 30, 2024

(54) MODULAR SOFTWARE ARCHITECTURE FOR MACHINE LEARNING PIPELINES

(71) Applicant: MCKINSEY & COMPANY, INC., New York, NY (US)

(72) Inventors: Roman Drapeko, London (GB); Sheldon Tein Tshun Tsen, London (GB); Wesley Weishu Leong, London (GB); Sam Bourton, London (GB); Jonathan Jenkins, London (GB)

(73) Assignee: MCKINSEY & COMPANY, INC., New York, NY (US)

Supplemental Examination Request:
No. 96/050,013, May 25, 2023

Reexamination Certificate for:
Patent No.: 11,586,432
Issued: Feb. 21, 2023
Appl. No.: 17/877,357
Filed: Jul. 29, 2022

Related U.S. Application Data

(60) Provisional application No. 63/227,762, filed on Jul. 30, 2021.

(51) Int. Cl.
*G06F 8/70* (2018.01)
*G06F 8/30* (2018.01)

(52) U.S. Cl.
CPC . *G06F 8/70* (2013.01); *G06F 8/31* (2013.01)

(58) Field of Classification Search
None
See application file for complete search history.

(56) References Cited

To view the complete listing of prior art documents cited during the supplemental examination proceeding and the resulting reexamination proceeding for Control Number 96/050,013, please refer to the USPTO's Patent Electronic System.

*Primary Examiner* — Eron J Sorrell

(57) ABSTRACT

As organizations scale analytics, a challenge is the huge increase in number of analytics pipelines to be maintained by developers. In here, lies an example method and modular software architecture to assemble analytics pipeline from reusable components. (1) Reusable components can be utilities where each utility is versioned and has a collection of programming functions, also known as nodes, that follow "data-in-data-out" convention. As nodes are building blocks of a pipeline, an assembly instruction and human readable configurations can now be created to define a project pipeline from a repository of pipelines and well-versioned utilities. (2) By separating out re-usable functionalities from pipelines and data layers, this layered architecture can now support upgrades of functionalities overtime without rewriting of pipelines. (3) As reusable components become functionally exhaustive, these assembly instructions and configurations can then be decoupled from pipelines as knowledge which developers can conduct meta-analysis of configurations used across projects.

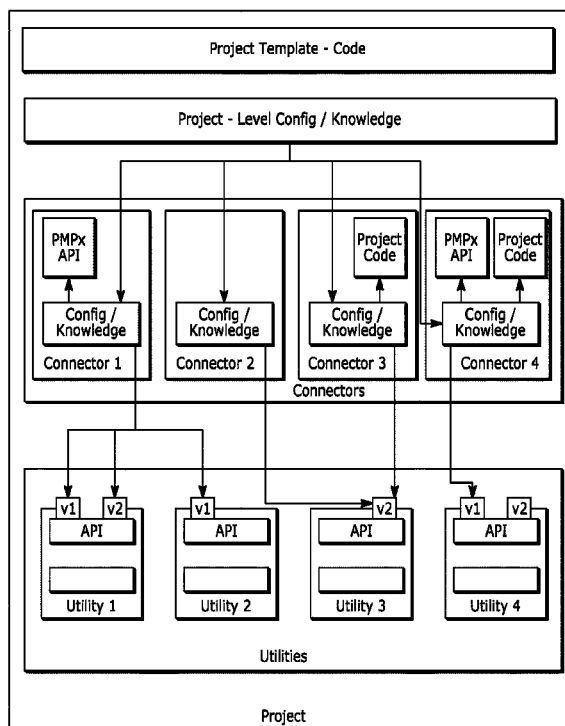

form: US 11,586,432 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6, 7, 8, 15, 16 and 20 are determined to be patentable as amended.

Claims 3-5, 9-14 and 17-19, dependent on an amended claim, are determined to be patentable.

1. A computer system comprising:
one or more processors *configured to receive input from a user*; and
a non-transitory computer-readable memory coupled to the one or more processors and storing instructions thereon that, when executed by the one or more processors, cause the computer system to:
access a set of one or more utilities and respective underlying nodes, wherein each node is configured to:
receive at least one input parameter; and
perform at least one operation on the at least one input parameter to generate at least one output parameter;
access a set of one or more connectors, wherein each connector is configured to:
receive at least one output parameter from a node of the set of one or more nodes; and
provide the at least one output parameter from the node of the set of one or more nodes to another node of the set of one or more nodes;
[receive input from a user indicating a first subset of nodes of the set of one or more nodes, and a first subset of connectors of the set of one or more connectors, to be included in a pipeline;] and
assemble [the] *a* pipeline *based on the input from the user, the input from the user indicating a first subset of nodes of the set of one or more nodes, and a first subset of connectors of the set of one or more connectors, to be included in the pipeline*, the pipeline including a particular ordering of the nodes of the first subset of nodes and the connectors of the first subset of connectors, *wherein the instructions that, when executed by the one or more processors, cause the computer system to assemble the pipeline based on the input from the user, include instructions that, when executed by the one or more processors, cause the computer system to determine the particular ordering of the nodes of the first subset of nodes and the connectors of the first subset of connectors included in the pipeline*.

2. The computer system of claim 1, wherein the pipeline is a first pipeline, *wherein the one or more processors are further configured to receive second input from the user, and* wherein the instructions, when executed by the one or more processors, further cause the computer system to:
[receive input from a user indicating a second subset of utilities of the set of one or more utilities and respective underlying nodes, and a second subset of connectors of the set of one or more connectors, to be included in a second pipeline; and]
assemble the second pipeline, *based on the second input from the user, the second input from the user indicating a second subset of utilities of the set of one or more utilities and respective underlying nodes, and a second subset of connectors of the set of one or more connectors, to be included in a second pipeline*, the *second* pipeline including a particular ordering of the nodes of the second subset of nodes and the connectors of the second subset of connectors.

6. The computer system of claim 1, *wherein the one or more processors are further configured to receive third input from the user, and* wherein the instructions, when executed by the one or more processors, further cause the computer system to:
[receive input from a user indicating at least a first pipeline and a second pipeline, to be included in a third pipeline; and]
assemble the third pipeline, *based on the third input from the user, the third input from the user indicating at least a first pipeline and a second pipeline, to be included in the third pipeline*, the third pipeline including a particular ordering of the first pipeline and the second pipeline.

7. The computer system of claim 1, *wherein the one or more processors are further configured to receive fourth input from the user, and* wherein the instructions, when executed by the one or more processors, further cause the computer system to:
[receive input from a user indicating one or more input parameters selected by the user;]
operate the pipeline, *based on the fourth input from the user, the fourth input from the user indicating one or more input parameters selected by the user,* on the one or more input parameters by providing the one or more input parameters to the pipeline based on the particular ordering of the nodes of the first subset of nodes and the connectors of the first subset of connectors;
determine one or more output parameters based on operating the pipeline on the one or more input parameters; and
provide, to the user, the one or more output parameters determined based on operating the pipeline on the one or more input parameters.

8. A computer-implemented method, comprising:
accessing, by one or more processors, a set of one or more utilities and respective underlying nodes, wherein each node is configured to:
receive at least one input parameter; and
perform at least one operation on the at least one input parameter to generate at least one output parameter;
accessing, by the one or more processors, a set of one or more connectors, wherein each connector is configured to:
receive at least one output parameter from a node of the set of one or more nodes; and
provide the at least one output parameter from the node of the set of one or more nodes to another node of the set of one or more nodes;
receiving, by the one or more processors, input from a user indicating a first subset of nodes of the set of one or more nodes, and a first subset of connectors of the set of one or more connectors, to be included in a pipeline; and
assembling, by the one or more processors, the pipeline *based on the input from the user*, the pipeline including a particular ordering of the nodes of the first subset of nodes and the connectors of the first subset of connectors, *wherein the assembling, by the one or more processors, the pipeline based on the input from the user includes determining, by the one or more processors, the particular ordering of the nodes of the first subset of nodes and the connectors of the first subset of connectors included in the pipeline.*

15. A non-transitory computer-readable medium coupled to one or more processors *configured to receive input from a user, the computer-readable* medium [and] storing instructions thereon that, when executed by the one or more processors, cause the one or more processors to:

access a set of one or more utilities and respective underlying nodes, wherein each node is configured to:
receive at least one input parameter; and
perform at least one operation on the at least one input parameter to generate at least one output parameter;
access a set of one or more connectors, wherein each connector is configured to:
receive at least one output parameter from a node of the set of one or more nodes; and
provide the at least one output parameter from the node of the set of one or more nodes to another node of the set of one or more nodes;
[receive input from a user indicating a first subset of nodes of the set of one or more nodes, and a first subset of connectors of the set of one or more connectors, to be included in a pipeline;] and
assemble [the] *a* pipeline *based on the input from the user, the input from the user indicating a first subset of nodes of the set of one or more nodes, and a first subset of connectors of the set of one or more connectors, to be included in the pipeline*, the pipeline including a particular ordering of the nodes of the first subset of nodes and the connectors of the first subset of connectors, *wherein the instructions that, when executed by the one or more processors, cause the one or more processors to assemble the pipeline based on the input from the user, include instructions that, when executed by the one or more processors, cause the one or more processors to determine the particular ordering of the nodes of the first subset of nodes and the connectors of the first subset of connectors included in the pipeline.*

16. The non-transitory computer-readable medium of claim 15, *wherein the one or more processors are further configured to receive second input from the user, and* wherein the pipeline is a first pipeline, and wherein the instructions, when executed by the one or more processors, further cause the one or more processors to:

[receive input from a user indicating a second subset of nodes of the set of one or more nodes, and a second subset of connectors of the set of one or more connectors, to be included in a second pipeline; and]
assemble the second pipeline, *based on the second input from the user, the second input from the user indicating a second subset of utilities of the set of one or more utilities and respective underlying nodes, and a second subset of connectors of the set of one or more connectors, to be included in a second pipeline*, the second pipeline including a particular ordering of the nodes of the second subset of nodes and the connectors of the second subset of connectors.

20. The non-transitory computer-readable medium of claim 15, *wherein the one or more processors are further configured to receive third input from the user, and* wherein the instructions, when executed by the one or more processors, further cause the one or more processors to:

[receive input from a user indicating at least a first pipeline and a second pipeline, to be included in a third pipeline; and]
assemble the third pipeline, *based on the third input from the user, the third input from the user indicating at least a first pipeline and a second pipeline, to be included in the third pipeline*, the third pipeline including a particular ordering of the first pipeline and the second pipeline.

\* \* \* \* \*